US005759943A

United States Patent [19]

Einziger et al.

[11] Patent Number: 5,759,943
[45] Date of Patent: Jun. 2, 1998

[54] DRY SPREADABLE WATER DISPERSIBLE GRANULE COMPOSITIONS

[75] Inventors: Mark David Einziger, Manalapan; Edward G. Fu, Kinnelon; Alan Joseph Stern, Plainsboro; Stanley John Kostka; Patrick Michael Holroyd, both of Cherry Hill, all of N.J.

[73] Assignee: Rhone-Poulenc Inc., Cranbury, N.J.

[21] Appl. No.: 651,289

[22] Filed: May 22, 1996

Related U.S. Application Data

[60] Provisional application No. 60/001,618, Jul. 28, 1995.

[51] Int. Cl.$^6$ .................... B01J 21/18; B01J 31/00; B01J 20/02
[52] U.S. Cl. .................... 502/182; 502/180; 502/153; 502/184; 502/417
[58] Field of Search .................... 502/180, 417, 502/182, 153, 184

[56] References Cited

U.S. PATENT DOCUMENTS

| | | | |
|---|---|---|---|
| 2,396,278 | 3/1946 | Lind | 252/138 |
| 2,486,921 | 11/1949 | Byerly | 252/138 |
| 2,486,922 | 11/1949 | Strain | 252/138 |
| 3,960,763 | 6/1976 | Lambou et al. | 252/428 |
| 3,996,161 | 12/1976 | Chia | 502/417 |
| 4,358,293 | 11/1982 | Mark | 44/51 |
| 4,488,881 | 12/1984 | Mark | 44/51 |
| 4,585,753 | 4/1986 | Scott et al. | 502/401 |
| 4,770,715 | 9/1988 | Mandel et al. | 134/40 |
| 4,817,647 | 4/1989 | Nelson | 134/40 |
| 4,831,011 | 5/1989 | Oikawa et al. | 502/417 |
| 4,857,243 | 8/1989 | Von Blucher et al. | 502/180 |
| 5,043,310 | 8/1991 | Takeuchi et al. | 502/416 |
| 5,282,873 | 2/1994 | Watari | 47/1.01 |
| 5,310,280 | 5/1994 | Hara | 405/38 |

FOREIGN PATENT DOCUMENTS

WO 90/03350 4/1990 WIPO .

OTHER PUBLICATIONS

Jordan & Smith, Weed Source, vol. 19, Issue 5 (Sep. 71) pp. 541–544.

*Primary Examiner*—Walter D. Griffin
*Assistant Examiner*—Patricia L. Hailey
*Attorney, Agent, or Firm*—John A. Shedden

[57] ABSTRACT

This invention relates to activated charcoal granule compositions which can be dry spread and "watered-in" to a site to reduce undesirable biological activity of deleterious organic compounds. When wet, these granules disperse very rapidly with a large dispersion area to original granule diameter ratio. The granules have high loadings of charcoal, i.e., from about 60 to about 95 weight percent and contain from about 5 to about 40 weight percent of a surfactant system which exhibits excellent dispersing; rewetting; and binding properties.

10 Claims, No Drawings

DRY SPREADABLE WATER DISPERSIBLE GRANULE COMPOSITIONS

This application claims the benefit under 35 U.S.C. Section 19(e) of U.S. provisional application Ser. No. 60/001,618 filed Jul. 28, 1995.

BACKGROUND OF THE INVENTION

1. Field of the Invention

This invention relates to highly dispersible compositions; their use as a carrier and/or an absorbent/adsorbent of undesirable compounds; and methods for preparing and using said compositions. More specifically and illustrative of a preferred embodiment of this invention, the invention relates to surfactant-activated charcoal compositions for agricultural use in the form of dry spreadable granules and methods of preparing same, and even more specifically for their use in the treatment of soil and turf that has been contaminated with pesticidal residue or other deleterious organic compounds, such as lubricating oil.

2. Description of Prior Art and Problems

Organic pesticides are widely used in soil and turf both by consumers and commercial operators and together with organic spills and leaks of, for example oil from mowing, tilling and other agricultural equipment, cause significant residue problems.

At the outset, agricultural chemical residue can, of course, seriously contaminate the environment. For example, agricultural pesticides which are utilized extensively on golf courses can, via rainwater, eventually end up in an aquifer or reservoir and possibly contaminate local drinking water. This residual contamination of the environment by agricultural chemicals is a large social problem and every effort is being made to minimize its long term impact. Also, there are many situations wherein an immediate change in crop or other plant life such as grass, is desired and so the initial plant life is eliminated chemically. The success of the second planting or seeding obviously will require the absence of any significant amounts of pesticide or toxic chemical residue.

Numerous methods have been proposed to deactivate these toxic organic residues.

U.S. Pat. No. 4,817,647 has proposed a method for removing oil spills from hydraulic mowing equipment on golf courses by utilizing an absorbent cover comprised of a non-woven mat of cellulose material. This mat is used sequentially with a detergent wash. Activated charcoal is a well known absorbent. It has been used in filters to detoxify water and other liquids; in gas masks for the purification of air; and various other applications. Therefore, it is not surprising that most of the prior art agricultural detoxification methods are also based on some activated charcoal usage. Typically, when used in a filter, the charcoal is in solid form, i.e., a bed of powder or granular material through which contaminated liquid or vapor is passed. However, for practical reasons, when large areas are to be treated, one must look to methods which permit a wide uniform distribution over the area requiring detoxification.

The use of activated charcoal for deactivation of various pesticides has been well documented (Jordan and Smith, *Weed Source*, Vol. 19, Issue 5 (Sept. 71) ppg. 541–544). In the Weed Source article, the material was used to absorb traces of pesticidal residues that could inhibit germination and/or establishment of turf or crop species. Unfortunately, the extremely high rates reported to be necessary to obtain satisfactory results have made its use relatively expensive and impractical for many widespread applications. As an aside, a few studies have been made in an attempt to determine the most effective activated charcoal vis-a-vis specific pesticide absorbency (Jordan and Smith, ibid.) and although superior absorption selections could be made among the charcoals tested, it was concluded that, with respect to absorbency, it seemed impossible to identify specifically a particular characteristic that correlated with absorption efficiency. In other words, pesticidal absorption efficiency could not be predicted from other properties of an activated charcoal.

Current formulations utilized for distributing activated charcoal uniformly over an area to be detoxified are either in the form of a dry powder; a wettable powder; a liquid suspension; a foam; or a dry granule. Although somewhat effective, each of the existing products identified above, has severe application limitations.

Dry carbon powders spread or sprayed over large areas that are subsequently traversed by the public, such as golf course greens and fairways, cause undesirable aesthetic effects, e.g., blackened golfers shoes and socks. Wettable powders are normally suspended in water and applied to the site or locus to be treated with a sprayer. Subsequent to application, these products are "watered in" to improve distribution within the thatch and upper layers of the soil. These dry powders are extremely light, dusty, messy, i.e., hard to remove from surfaces, and difficult to wet. In addition, once wet, the powders form unstable suspensions and sediment. In order to maintain a reasonable dispersion in the tank and, thus, a uniform distribution on the locus, the aqueous suspension must be vigorously agitated. Furthermore, such powder suspensions cause excessive wear to delivery equipment, such as sprayer pumps, and plug screens and nozzles. Thus powder suspensions present extreme application difficulties for the intended end-user.

Liquid formulations of activated charcoal are normally low concentration suspensions, i.e., about 25 weight percent activated charcoal, in water. These formulations usually contain high loadings of suspension agents to ensure stability of the formulated product. Although these liquid products offer the advantage of ease of handling by avoiding the dusting, mixing, and application problems inherent with the use of powders, the low concentrations require the transport of large volumes of water. Additionally these formulations tend to become unstable after several temperature changes, for example, a freezing and thawing. Therefore, these liquid formulations also tend to be expensive to the end-user. U.S. Pat. No. 4,585,753 (Scott et al.) discloses a typical liquid activated charcoal formulation for the treatment of contaminated soil and turf which, in order to deliver two hundred and twenty pounds (220 lbs.) of charcoal, requires about seven hundred and sixty pounds (760 lbs.) of water and sixty pounds (60 lbs.) of surfactants.

U.S. Pat. No. 3,960,763 (Lambou et al.) discloses the use of activated charcoal foams for agricultural use, specifically to detoxify soil. Although these foams are stated to be low cost, with easy generation, zero toxicity and permit a uniform distribution of charcoal to the site, the charcoal concentrations are said to be on the order of 1–6% by weight. Aside from having to utilize a foam generator, one can easily see that the major problem attendant the liquid formulations is also present with foam applications, that is, the need to transport large volumes of water.

Granule forms of activated charcoal are also known in the art and overcome many of the problems of the powder, liquid and foam systems discussed above. However, although granular products are relatively easy to spread onto a soil or turf surface, the surface area of particle-affected surface to particle size is very low, i.e. too low for efficient absorption of the toxic compounds. As a result, it is necessary to overload the selected site with the granules which results in an expensive and often unsightly operation. Efforts to counteract this low dispersion efficiency usually take the form of attempting to optimize the charcoal substrate to the particular toxicant through trial and error (See Jordan and Smith, above). This approach can lower the total granule delivery amount to the site somewhat, but the extent of the coverage necessary to achieve the desired detoxification effect continues to make this procedure a commercially impractical one.

It is an object of the present invention to prepare dry spreadable activated charcoal granules which can be applied with a dry spreader to a target area and, when exposed to water via, for example, rain or irrigation, will not only readily decompose, but actively disperse so as to achieve disperse area to granule diameter ratios larger than that heretofore realized. These dry spreadable, water dispersible granules are easy to formulate, ship, store, and apply. The granules also possess very high activated charcoal loadings.

SUMMARY OF THE INVENTION

This invention provides water dispersible activated charcoal granule compositions for use as a dry spreadable material to deactivate organic residues of pesticides in soil and turf. The granule utilizes, in addition to the activated charcoal, from about 5 to about 40 weight percent of a surfactant composition designed to provide binding, rewetting and dispersion properties to the granules.

DETAILED DESCRIPTION OF THE INVENTION

The instant invention relates to the discovery of a dry spreadable, water dispersible activated charcoal granule which, when exposed to water, has a high dispersion area to granule diameter ratio. As a result, when the granules of this invention are dry spread and water treated, the area affected by the granule formulation is much enhanced over that realizable with the dry spreadable granules of the prior art.

By activated charcoal is meant charcoal characterized by a large surface area per unit volume. This is the result of an enormous number of the pores within the structure. Activated charcoal is derived from wood, cellulose, peat and coals of bituminous or lower rank by heating, usually at about 900° C. for a brief period in air, carbon dioxide or steam to render it more porous and efficient. The enhanced absorption/adsorption properties of the activated charcoal result from the very large internal surface area, hence its valuable capacity to detoxify soil and turf from residual contaminants such as pesticides and/or oil.

The effective activated charcoal of this invention has a surface area of greater than 300 square meters per gram, preferably greater than 400 square meters per gram and a mean pore diameter of less than 100 angstroms; preferably less than 50 angstroms.

The surfactant composition of the present invention which is present at from about 5 to about 40 weight percent of the total granule composition, preferably from about 10 to about 25 weight percent, and most preferably from about 15 to about 20 weight percent, provides essentially three properties to the dry spreadable, water dispersible granules.

The first property that the surfactant composition must possess is that of being a binder for the particles in the granule so that after the processing and agglomerating water used in the initial preparation of the granule has been driven off, residual surfactant will act as a binder to form a hard, easily handleable, i.e., dry spreadable granule.

The second characteristic that the surfactant composition must possess is a good rewetting ability such that when the granule is applied to the site to be treated and exposed to water, the surfactant composition will enable the water to easily penetrate the interstices of the individual charcoal particles quickly, i.e., "wet" the internal surface areas of the particles. It is theorized that this rapid rewetting of the internal surfaces results in a displacement of the air initially entrapped within the particles which then provides an additional dispersion mechanism for the granules of this invention.

The third property that the surfactant composition must possess is the ability to aid in the breaking up and rapid dispersion of the particles initially in the granule.

In summary, the surfactant composition should possess the characteristic properties of being a good binder, rewetting agent, and dispersing aid. These properties could, of course, be found to a limited extent in a single component surfactant composition, but preferably at least a two-component composition is utilized. As will be noted below, polymeric or bulky dispersants often can function as acceptable binders. A three-component surfactant composition in which each surfactant is optimized for one of the aforedescribed, desired properties of the composition is most preferred.

The dispersants of the instant invention are usually present at from about 3 to about 20 weight percent; preferably from about 6 to about 10 weight percent based on the total weight of the granule composition. Although certain nonionics can function as dispersants, typically the high molecular weight materials, i.e., the polymerics, the preferred dispersant surfactants of this invention are the solid (at room temperature, i.e., 24° C.), high molecular weight anionic surfactants.

The rewetting agents of the instant invention are usually present at from about 2 to about 20 weight percent, preferably from about 2 to about 3 weight percent based on the total weight of the granule composition. Although certain nonionics can function as rewetting agents, typically the low molecular weight materials, i.e., non-polymerics, the preferred rewetting surfactants of this invention are the solid (at room temperature), lower molecular weight anionic surfactants. These surfactants are selected for their ability to move more quickly in aqueous solutions than those anionics used as dispersants.

The binders for the granules of this invention, usually present from about 0 to about 10 weight percent, preferably from about 2 to about 6 weight percent based on the total weight of the granule composition, can be traditional binders well known in the art such as the starches, the sugars, etc., but preferably the granules of this invention use residuals or the secondary characteristics of the dispersing agents and/or rewetting agents described herein as the binding agents.

The anionics useful in the surfactant compositions of this invention include the alkyl and alkyl ether sulfates. These materials have the respective formulae $ROSO_3M$ and $RO(C_2H_4O)$. $SO_3M$ wherein R is an alkyl, alkenyl or alkylauryl group of about 8 to about 22 carbon atoms, x is 1 to 10, preferably 1 to 4, and M is a water-soluble cation such as ammonium, sodium, potassium, magnesium, triethanolamine (TEA), etc. The alkyl ether sulfates useful in the present invention are condensation products of ethylene oxide and monohydric alcohols having about 8 to about 22 carbon atoms. Specific examples of the above sulfates include ammonium lauryl sulfate, magnesium lauryl sulfate, sodium 2-ethyl-hexyl sulfate, sodium actyl sulfate, sodium oleyl sulfate, sodium tridecyl sulfate, triethanolamine lauryl sulfate, ammonium linear alcohol, ether sulfate ammonium nonylphenol ether sulfate, and ammonium monoxynol-4-sulfate.

Another suitable class of anionic surfactants are the water-soluble salts of the general formula:

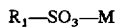

wherein $R_1$ is selected from the group consisting of:

i) a straight or branched chain, saturated aliphatic hydrocarbon radical having from 8 to 24, preferably 12 to 18 carbon atoms;

ii) a mono-, di-, or tri- $C_1$ - $C_6$ alkyl substituted aryl wherein the aryl is preferably a phenyl or naphthyl group;

iii) alpha-olefins having 12 to 24 carbon atoms, preferably 14 to 16 straight chain carbon atoms, most preferably 1-dodecene, 1-tetradecene, 1-hexadecene, 1-octadecene, 1-eicosene, and 1-tetracosene; and iv) naphthalene-formaldehyde condensation products.

Specific examples include SUPRAGIL MNS/90, a trademark of Rhône-Poulenc Inc. for an alkylnaphthalenesulfonate-formaldehyde condensate and SUPRAGIL WP, a trademark of Rhone-Poulenc Inc. for an alkylnaphthalenesulfonate.

Additional examples of anionic synthetic surfactants which come within the terms of the present invention are: i) the isethionates, i.e., the reaction products of fatty acids esterified with isethionic acid and neutralized with sodium hydroxide where, for example, the fatty acids are derived from coconut oil; and ii) the n-methyl taurates, i.e., the sodium or potassium salts of fatty acid amides of methyl tauride in which the fatty acids, for example, are derived from coconut oil. Other anionic synthetic surfactants of this variety are set forth in U.S. Pat. Nos. 2,486,921; 2,486,922; and 2,396,278.

Still other anionic synthetic surfactants include the classes designated as the sulfosuccinates and sulfo succinamates. These are of the general formulae:

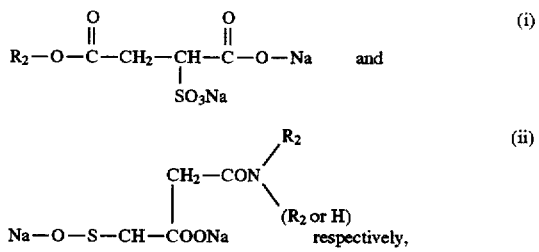

wherein $R_2$ is a $C_2$–$C_{20}$ alkyl or alkylamido. These classes include such surface active agents as disodium N-octadecylsulfo-succinamate; tetrasodium N-(1,2-dicarboxyethyl)-N-octadecylsulfo-succinamate; diamyl ester of sodium sulfosuccinic acid; dihexyl ester of sodium sulfosuccinic acid; and dioctyl esters of sodium sulfosuccinic acid.

Another class of anionic organic surfactants are the B-alkyloxy alkane sulfonates. These compounds have the following formula:

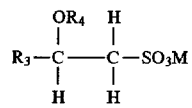

where $R_3$ is a straight chain alkyl group having from 6 to 20 carbon atoms, $R_4$ is a lower alkyl group having from 1 to 3 carbon atoms, and M is a water-soluble cation as hereinbefore described.

Specific examples of B-alkyloxy-alkane-1-sulfonates, or alternatively 2-alkyloxy-alkane-1-sulfonates include:

potassium-B-methoxydecanesulfonate, sodium 2-methoxy-tridecanesulfonate, potassium 2-ethoxytetradecyl-sulfonate, sodium 2-isopropoxyhexadecylsulfonate, lithium 2-t-butoxytetradecylsulfonate, sodium B-methoxyoctadecylsulfonate, and ammonium B-n-propoxydodecylsulfonate.

Also to be included in the anionic class of surfactants are the disulfonates of the general formula:

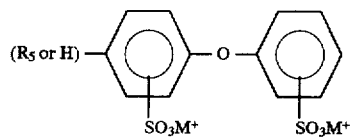

wherein $R_5$ is a $C_8$–$C_{20}$ alkyl group and M is a water-soluble cation as hereinabove described. The preferred anionics of the disulfonate class are disodium dodecyl diphenyloxide disulfonate and ethoxylated nonylphenyl ammonium disulfonate. All of the above-described anionic surfactants and mixtures thereof may or may not be ethoxylated with from about 1 to about 10 ethylene oxide units per "R" unit.

Also useful as a dispersant surfactant for the granules of the instant invention are the alkali and alkali earth metal salts of the lignosulfonates.

Illustrative of the nonionics which are useful in the surfactant compositions of this invention include the following:

A) Amides such as:
i) Alkanolamides of the formula

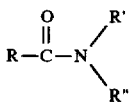

wherein R' and R" each can be —H, —$CH_2CH_2OH$, or

—$CH_2$—CH—OH;
          |
          $CH_3$ ii) ethoxylated alkanolamides of the formula

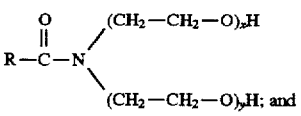

iii) ethylene bisamides of the formula $$\begin{array}{c} O \\ \parallel \\ R-C \\ \diagdown \\ N-CH_2-CH_2-N \\ \diagup \hspace{2cm} \diagdown \\ H \hspace{2cm} C-R \\ \parallel \\ O \end{array}$$

B) Esters such as:

i) fatty acid esters of the formula $$R-\overset{O}{\underset{\parallel}{C}}-O-R_1;$$

ii) glycerol esters of the formula $$R-\overset{O}{\underset{\parallel}{C}}-O-CH_2-\underset{\underset{OH}{|}}{CH}-CH_2-O-R_1$$

iii) ethoxylated fatty acid esters of the formula $$R-\overset{O}{\underset{\parallel}{C}}-O(CH_2CH_2O)_x-R_1;$$

iv) sorbitan esters of the formula $$\text{sorbitan ester structure with } CH-CH_2-O-\overset{O}{\underset{\parallel}{C}}-R; \text{ and}$$

v) ethoxylated sorbitan esters of the formula $$\text{ethoxylated sorbitan ester structure}$$

C) Ethoxylates such as:

i) alkylphenol ethoxylates of the formula $$R-\text{(phenyl)}-(OCH_2CH_2)_nOH;$$ with $R_1$ substituent ii) alcohol ethoxylates of the formula $$R-O-(CH_2CH_2O)_nH;$$

iii) tristyrylphenol ethoxylates of the formula $$\text{tristyrylphenol ethoxylate structure with } (OCH_2CH_2)_nOH \text{ ; and}$$

iv) mercaptan ethoxylates of the formula $$R-S-(CH_2CH_2O)_nH$$

D) End-capped and EO/PO block copolymers such as:

i) alcohol alkoxylates of the formula $$R-(OCH_2CH_2)_x-(O-\underset{\underset{CH_3}{|}}{CH}-CH_2)_m-OH;$$

ii) ethylene oxide/propylene oxide block copolymers of the formula $$HO-(CH_2CH_2O)_x(CH_2-\underset{\underset{CH_3}{|}}{CH}-O)_m-(CH_2CH_2O)_y-H;$$

iii) copolymers of the formula $$HO(\underset{\underset{CH_3}{|}}{CH}-CH_2O)_m-(CH_2CH_2O)_x-(CH_2-\underset{\underset{CH_3}{|}}{CHO})_nH;$$

iv) chlorine capped ethoxylates of the formula $$R-(OCH_2CH_2)_xCl;\text{ and}$$

v) tetra-functional block copolymers of the formula $$\text{tetra-functional block copolymer structure}$$

or $$\text{alternate tetra-functional block copolymer structure}$$

wherein

R is a fatty alkyl group, preferably a $C_6$–$C_{22}$ fatty alkyl group, most preferably a $C_8$–$C_{18}$ fatty alkyl group;

$R_1$ is —H or a fatty alkyl group, preferably —H or a $C_6$–$C_{22}$ fatty alkyl group, most preferably —H or a $C_8$–$C_{18}$ fatty alkyl group;

x, x', y, y' and n are each independently moles of ethylene oxide preferably 1 to 300; most preferably 1 to 150; and m, m', l and l' are each independently moles of propylene oxide, preferably 1 to 300; most preferably 1 to 150.

Among the preferred dispersing agents are: the alkylnaphthalenesulfonate-formaldehyde condensates; sodium lignosulfonate, the ethylene oxide/propylene oxide block copolymers, and acid, salts and copolymers of the polyacrylates.

Among the preferred rewetting agents are: the alkylnaphthalenesulfonates, sodium methyloleoyl taurate, the sulfosuccinates, the carboxylates, the alkylarylsulfonates, the ethoxylated alkyl phenols and the ethoxylated alcohols.

Although electrostatic dispersants such as the anionics are preferred, steric dispersants such as the polyvinyl alcohols can also be used.

Although the dry spreadable, water dispersible granules of this invention can be prepared by a standard pan granulation process, it is preferred to prepare the granules via an extrusion process. The extrusion granulation process is as follows: First, each component is weighed and dry blended in a double ribbon blender. Water is then added with continuous mixing until from about 15 to about 25 weight percent, preferably about 20% moisture content is realized. The mixture is then fed to a low pressure single screw extruder and a sufficient amount of additional water is added, usually from about 10 to about 40 weight percent of the total weight of the mix, preferably from about 10 to about 13% to produce a semi-cohesive wet mass which is suitable for extrusion. The wet mass is extruded through a die having openings with diameters from about 0.8 mm to about 2.0 mm, preferably about 1 mm. The extrudate is then fed to a vibratory fluidized bed dryer which reduces the moisture content to below about 4; preferably to below about 2.5 weight percent; the weight percents being based on the total weight of the composition at that respective step in the process. The product is then sieved in a particle classifier to remove oversized and undersized granules. It is preferred that the final product is that which passes through a 10 mesh screen but will not pass through a 60 mesh screen.

A characteristic of the dry spreadable, water dispersible charcoal granules of this invention is the speed with which the granules disperse in water. When the granules of this invention are gently placed on the surface of cold tap water (about 20° C.) in, for example, a beaker, the granules, with no mechanical energy input, will completely disperse within forty (40) to one hundred (100) seconds. Most conventional water dispersible granules require from five (5) to thirty (30) or more inversions of the beaker to effect a similar result in a similar time period.

The present invention is demonstrated in detail in the following non-limiting working examples.

EXAMPLES 1–7

A series of dry spreadable, water dispersible granules was prepared as described above using seven different charcoals. The Surface Area, Pore Volume and Mean Pore Diameters of each of the charcoals utilized and their identities are as listed below in Table I. The formulation for all seven granules was as follows:

|  | Weight Percent (%) (Based on Total Weight) |
|---|---|
| Carbon | 80 |
| REAX 88B* | 15 |
| GEROPON T-77** | 5 |

*REAX 88B is a trademark of Westvaco for sodium lignosulfonate.
**GEROPON T-77 is a trademark of Rhone-Poulenc Inc. for sodium methyl alkyl taurate.

A granule expansion test was conducted on each of the samples as follows:

1) The diameters of ten (1) granules were measured with a set of calipers and the average diameter $D_1$ calculated.

2) The ten (10) granules were scattered on a porous water absorbent substrate, i.e., a paper towel.

3) Two drops of water were added to each granule and allowed to stand for one minute.

4) The diameters of the wet granules were measured with the calipers and the average diameter $D_2$ calculated.

5) The Expansion Ratio was calculated as $D_2/D_1$.

The results of the above granule expansion tests are as indicated below in Table I.

TABLE I

Express Mail No. EM105270988 US

| Carbon Product Name | WATERCARB | NUCHAR S-A | Type XZ | Type 205 AP | Grade A-625 | Grade 4072-C | FW 18 |
|---|---|---|---|---|---|---|---|
| Trademark of | Acticarb | Westvaco | Barneby & Sutcliffe | Barneby & Sutcliffe | Asbury Graphite Mills | Anthracite Ind. | Degussa |
| For (Carbon Type) | Activated Carbon | Activated Carbon | Activated (Coconut shell) carbon | Activated (Coal-based) carbon | Artificial graphite | Ground met. coke | Carbon black |
| Surface Area, m²/g | 471 | 1430 | 975 | 535 | 17.8 | 6.2 | 213 |
| Pore Volume, cm³/g | 0.283 | 1.14 | 0.596 | 0.328 | 0.073 | 0.024 | 1.54 |
| Mean Pore Diameter, Ang. | 24.1 | 31.8 | 24.4 | 24.5 | 164 | 154 | 290 |
| Granule Expansion Ratio | 1.9 | 2.3 | 1.8 | 1.6 | 1 | 1 | 1 |

It is apparent from the above results that the dry spreadable, water dispersible activated charcoal granules of the present invention, i.e., those having surface areas in excess of 300 square meters per gram and mean pore diameters of less than 100 angstroms have unexpected superior dispersing characteristics when exposed to a water environment.

Although not to be considered limiting in any way on the scope of the invention, it is proposed that the following mechanism may be responsible for the extraordinary dispersion of the granules of this invention when water is placed in intimate contact with them. In addition to the dissolution and weakening of the binding material, air, which is initially entrapped within the interstices of the particles comprising the granules, i.e. within the porous structure of the formulated, granule compositions, is released and/or displaced when a liquid enters the pores. This expands the volume or increases the pressure within the wetted granule thus aiding in its disintegration and enhancing its dispersion.

Based on this hypothesis, the granule expansion should be approximately proportional to the internal pore volume. The data in Table I indicates that the granule expansion results are, in fact, in general agreement with the Surface Area and Pore Diameter measurements.

EXAMPLES 8-15

It has also been discovered that the friability of the granules of this invention can be reduced with small to negligible effect on granule disintegration and/or dispersion in water via the addition of a small amount, i.e., up to 8 weight percent; preferably from about 1 to 6 weight percent, more preferably from about 2 to 5 weight percent based on the total weight of the granule, of a nonionic surfactant, preferably a polyethylene glycol/polypropylene glycol (EO/PO) block copolymer.

A series of dry spreadable, water dispersible granules was prepared as in Examples 1-7 using various levels of ANTAROX P-104, (a trademark of Rhone-Poulenc for an EO/PO block copolymer). As the weight percent of the block copolymers (x) was increased, an equivalent weight percent of the primary dispersant, SUPRAGIL MNS-90 was removed.

The formulation for all the examples in this series was as follows:

| | Weight Percent (%) (Based on Total Weight) |
|---|---|
| Acticarb Carbon | 85 |
| SUPRAGIL MNS/90* | 8-x |
| SUPRAGIL WP ** | 3 |
| SOPROPHOR S/40-P *** | 4 |
| ANTAROX P-104 | x |

*SUPRAGIL MNS/90 is a trademark of Rhône-Poulenc Inc. for an alkylnaphthalenesulfonate-formaldehyde condensate.
** SUPRAGIL WP is a trademark of Rhône-Poulenc Inc. for an alkylnaphthalenesulfonate
*** SOPROHOR S/40-P is a trademark of Rh+e,cir +ee one-Poulenc Inc. for a tristyrylphenol ethoxylate.

The friability was determined using a Van Kel friabilator set for 500 revolutions. Fifteen (15) grams of granules were used. The friability reported in Table 2 below is the percentage of the initial 15 grams that was lost as "fines" during the test.

Residual moisture was determined using a moisture balance.

TABLE 2

| Antarox P-104 (%) x | Friability (%) | Moisture (%) |
|---|---|---|
| 0 | 4 | 2.5 |
| 1 | 2.3 | 5.1 |
| 2 | 1 | 5.2 |
| 3 | 1 | 4.3 |
| 4 | 0 | 4.5 |
| 5 | 0 | 2.2 |
| 6 | 1 | 4.9 |
| 8 | 1.3 | 3.5 |

Thus, it is observed that the friability of the granules can largely be eliminated via the use of a nonionic surfactant, if one desires to do so.

EXAMPLES 16-18

A dry spreadable, water dispersible granule of this invention was prepared as the samples were prepared in Examples 1-7 with the following formulation:

| | WEIGHT PERCENT (BASED ON TOTAL GRANULE WEIGHT) |
|---|---|
| CALGON WPX (CALGON'S TRADEMARK FOR ACTIVATED CARBON | 70 |
| Surface Area, $M^2/g$: | 1000-1300 |
| Pore Volume, $cm^3/g$: | 0.8-1.3 |
| IGEPAL CO630* | 24.4 |
| SUPRAGIL WP | 4.5 |
| AgRHO SA 101** | 0.3 |
| FOAMEX AD 300*** | 0.8 |

*IGEPAL CO630 is a trademark of Rhône-Poulenc Inc. for an ethoxylated (9EO) nonylphenol.
**AgRH~SA 101 is a trademark of Rhône-Poulenc Inc.—a xanthan gum/ guar gum suspending agent mixture.
***FOAMEX AD 300 is a trademark of Rhône-Poulenc Inc. for a silicone antifoaming agent.

This material is identified herein as CLEAN CARBON 70 WDG. CLEAN CARBON is a trademark of Aquatrols Corporation for activated charcoal, water dispersible granules. A number of test plots containing *P. annua* grass were treated with the selective herbicide KERB 50 WP, a trademark of Rohm and Haas Co. for 3, 5-dichloro-N(1,1-dimethyl-2-propyl) benzamide (common names, pronamide (WSSA) and propyzamide) fifteen days before overseeding the plots with the perennial ryegrass *Lolium perenne* (L per.).

A second number of test plots containing *P. annua* grass were also treated with the KERB herbicide fifteen days before overseeding the plots with the *Lolium perenne;* however, in addition, two days before the overseeding, the plots were treated with CLEAN CARBON 70 WDG.

Details of the above tests and the results, expressed as the percentage of the *Lolium perenne* that germinated, are given in Table 3 below.

TABLE 3

| Treatment | Rate | Growth Stage | L. per. Density 0-100% 30 DAO* | L. per. Density 0-100% 60 DAO | L. per. Density 0-100% 90 DAO |
|---|---|---|---|---|---|
| KERB 50 WP | 2 lbai/ac | 15 DBO** | 32.5 | 36.3 | 70.0 |
| KERB 50 WP | 2 lbai/ac | 15 DBO | 65.0 | 62.5 | 86.3 |

TABLE 3-continued

| Treatment | Rate | Growth Stage | L. per. Density 0–100% 30 DAO* | L. per. Density 0–100% 60 DAO | L. per. Density 0–100% 90 DAO |
|---|---|---|---|---|---|
| CLEAN CARBON 70 WDG | 5 ai/1000 ft² | 2 DBO | | | |
| Untreated | | | 83.8 | 88.8 | 95.0 |

*DAO means days after overseeding.
**DBO means days before overseeding.

The untreated results are indicative of the normal L per. germination rates expected in an untreated plot. One can see by the above results, the significant detoxification effects realized by application of the highly dispersible, activated charcoal granules of the instant invention.

Of course, it is recognized that the water dispersible granules in this invention can be tank mixed under practices well known in the agricultural art and their suspensions are superior to currently used granules with no adverse effects on the application machinery.

Various modifications of the present invention will be apparent to those skilled in the art without departing from the scope of the invention.

What is claimed is:

1. A dry spreadable, water dispersible granular composition, comprising:
   a) from 60 to 90 weight percent of activated charcoal having an internal surface area of greater than 300 square meters per gram and a mean pore diameter of less than 100 angstroms; and
   b) from 5 to 40 weight percent of a surfactant composition wherein said surfactant composition comprises:
      i) from 3 to 20 weight percent of a high molecular weight polymeric nonionic or anionic surfactant dispersant;
      ii) from 2 to 20 weight percent of a low molecular weight non-polymeric nonionic or anionic surfactant wetting agent; and
      iii) from 0 to 10 weight percent of a binder; wherein the weight percents are based on the total weight of the granular composition.

2. The dry spreadable, water dispersible granular composition of claim 1 wherein:
   i) the surfactant dispersant is a high molecular weight polymeric anionic; and
   ii) the surfactant rewetting agent is a low molecular weight non-polymeric anionic.

3. The dry spreadable, water dispersible granular composition of claim 1 wherein the activated charcoal has an internal surface area of greater than 400 square meters per gram and a mean pore diameter of less than 50 angstroms.

4. The dry spreadable, water dispersible granular composition of claim 1 wherein the high molecular weight polymeric anionic surfactant dispersant is selected from the group consisting of:
   a) water-soluble salts of the formula:

$$R_1-SO_3-M$$

wherein M is a water-soluble cation and $R_1$ is selected from the group consisting of naphthalene-formaldehyde condensation products;

b) alkali or alkali earth metal salts of lignosulfonates;
   c) ethoxylated derivatives of the polymeric anionic surfactants identified above; and
   d) mixtures thereof.

5. The dry spreadable, water dispersible granular composition of claim 1 wherein the low molecular weight non-polymeric anionic surfactant wetting agent is selected from the group consisting of:
   i) Alkyl and alkyl ether sulfates; and
   ii) water-soluble salts of the formula:

$$R_1-SO_3-M$$

wherein M is a water-soluble cation and $R_1$ is selected from the group consisting of:
      a) a straight or branched chain, saturated aliphatic hydrocarbon radical having from 8 to 24 carbon atoms;
      b) a mono-, di-, or tri-$C_1$–$C_6$ alkyl substituted aryl; and
      c) alpha-olefins having 12 to 24 carbon atoms;
   iii) isethionates;
   iv) N-methyl taurates;
   v) sulfosuccinates;
   vi) sulfosuccinamates;
   vii) B-alkoxy alkane sulfonates;
   viii) disulfonates;
   ix) ethoxylated derivatives of the above-identified low molecular weight non-polymeric anionic surfactants and
   x) mixtures thereof.

6. The dry spreadable, water dispersible granular composition of claim 1 wherein the high molecular weight polymeric nonionic surfactant dispersant is selected from the group consisting of:
   the following end-capped and EO/PO block copolymers:
   i) alcohol alkoxylates of the formula:

$$R-(OCH_2CH_2)_x-(O-\underset{\underset{CH_3}{|}}{C}H-CH_2)_m-OH;$$

ii) ethylene oxide/propylene oxide block copolymers of the formula $$HO-(CH_2CH_2O)_x(CH_2-\underset{\underset{CH_3}{|}}{C}H-O)_m-(CH_2CH_2O)_y-H;$$

iii) copolymers of the formula $$HO(\underset{\underset{CH_3}{|}}{C}H-CH_2O)_m-(CH_2CH_2O)_x-(CH_2-\underset{\underset{CH_3}{|}}{C}HO)_lH;$$

iv) tetra-functional block copolymers of the formula $$\begin{array}{c}H(OCH_2CH_2)_{\overline{x}}(OCHCH_2)_m\\|\\CH_3\end{array}\diagdown NCH_2CH_2N \diagup \begin{array}{c}(CH_2CHO)_{\overline{m}}(CH_2CH_2O)_xH\\|\\CH_3\end{array}$$

$$\begin{array}{c}H(OCH_2CH_2)_{\overline{y}}(OCHCH_2)_l\\|\\CH_3\end{array}\diagup \qquad \diagdown \begin{array}{c}(CH_2CHO)_l(CH_2CH_2O)_yH\\|\\CH_3\end{array}$$

-continued

OR

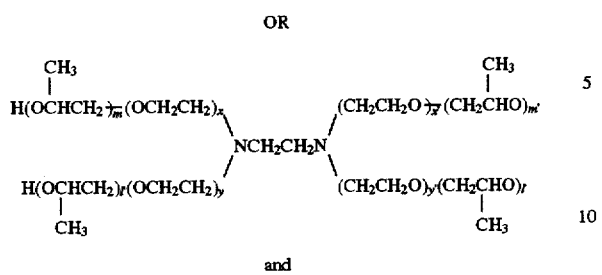

and v) mixtures thereof;

wherein

R is a fatty alkyl group;

x, x', y, and y' are each independently moles of ethylene oxide; and m, m', l and l' are each independently moles of propylene oxide.

7. The dry spreadable, water dispersible granular composition of claim 1 wherein the low molecular weight, non-polymeric nonionic surfactant wetting agent is selected from the group consisting of:

A) The following amides:

i) Alkanolamides of the formula

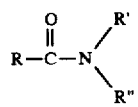

wherein R' and R" each can be —H, —CH$_2$CH$_2$OH, or

—CH$_2$—CH—OH;
         |
         CH$_3$ ii) ethoxylated alkanolamides of the formula

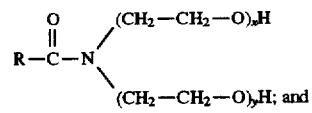

iii) ethylene bisamides of the formula

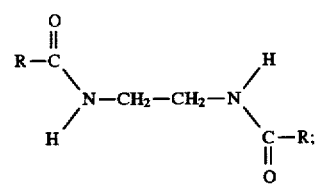

B) The following esters:

i) fatty acid esters of the formula

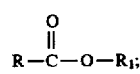

ii) glycerol esters of the formula

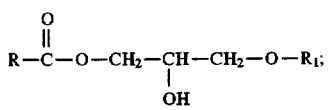

iii) ethoxylated fatty esters of the formula

iv) sorbitan esters of the formula

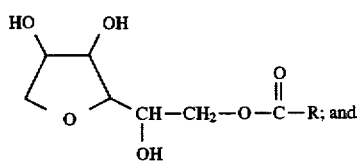

v) ethoxylated sorbitan esters of the formula

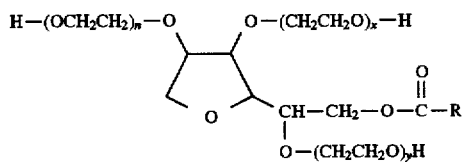

C) The following ethoxylates:

i) alkylphenol ethoxylates of the formula

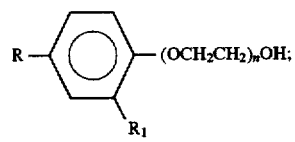

ii) alcohol ethoxylates of the formula

R—O—(CH$_2$CH$_2$O)$_n$H;

iii) tristyrylphenol ethoxylates of the formula

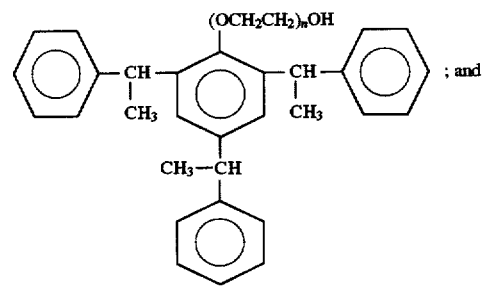

iv) mercaptan ethoxylates of the formula

R—S—(CH$_2$CH$_2$O)$_n$H;

D) Chlorine capped ethoxylates of the formula

R—(OCH$_2$CH$_2$)$_x$Cl;

E) Mixtures thereof;

R is a fatty alkyl group;

$R_1$ is —H or a fatty alkyl group;

x, y, and n are each independently moles of ethylene oxide.

8. A dry spreadable, water dispersible granular composition comprising:
   a) from 80 to 95 weight percent activated charcoal having an internal surface area of greater than 300 square meters per gram and a mean pore diameter of less than 100 angstroms;
   b) from 3 to 10 weight percent alkylnaphthalenesulfonate-formaldehyde condensate;
   c) from 1 to 5 weight percent alkylnaphthalenesulfonate; and
   d) from 1 to 5 weight percent tristyrylphenol ethoxylate, all of the weight percents being based on the total weight of the composition.

9. The dry spreadable, water dispersible granular composition of claim 8 additionally comprising:

from 1 to 6 weight percent of a nonionic, ethylene oxide/propylene oxide block copolymer.

10. A process for preparing a dry spreadable, water dispersible granular composition comprising the steps of:
   i) blending
      a) from 60 to 95 weight percent of activated charcoal having an internal surface area of greater than 300 square meters per gram and a mean pore diameter of less than 400 angstroms with
      b) from 50 to 40 weight percent of a surfactant composition comprising surfactants selected from the group consisting of nonionics, anionics, and combinations thereof;
   ii) adding sufficient water with continuous mixing to form a mixture with a moisture content of from about 15 to about 25 weight percent;
   iii) adding from about 10 to about 40 weight percent of additional water to said mixture to form a semi-cohesive wet mass;
   iv) forming an extrudate by extruding said wet mass through an extruder die having openings with diameters of from about 0.8 mm to about 2.0 mm; and
   v) drying the extrudate to a moisture content below about 4 weight percent; wherein all of the weight percents are based on the total weight of the compositions at the respective step in the process.

* * * * *

UNITED STATES PATENT AND TRADEMARK OFFICE
CERTIFICATE OF CORRECTION

PATENT NO. : 5,759,943
DATED : Jun. 2, 1998
INVENTOR(S) : Mark David Einziger, Edward G. Fu, Alan Joseph Stern, Stanley John Kostka, and Patrick Michael Holroyd It is certified that error appears in the above-identified patent and that said Letters Patent is hereby corrected as shown below: On title page, item [73] should read as follows:

Assignees: Rhodia Inc., Cranbury, N.J.
Aquatrols Corporation of America, Inc., Cherry Hill, N.J.

Signed and Sealed this

Tenth Day of August, 1999

*Attest:*

Q. TODD DICKINSON

*Attesting Officer*  *Acting Commissioner of Patents and Trademarks*